US010432007B2

(12) United States Patent
Chang et al.

(10) Patent No.: US 10,432,007 B2
(45) Date of Patent: Oct. 1, 2019

(54) CIRCUITS, SYSTEMS AND METHODS FOR BALANCING POWER FOR SYSTEM LOAD COMPONENTS

(71) Applicant: DELL PRODUCTS L.P., Round Rock, TX (US)

(72) Inventors: Chen-Hsin Chang, Keelung (TW); Chih-Chiang Tsui, Taipei (TW)

(73) Assignee: Dell Products L.P., Round Rock, TX (US)

( * ) Notice: Subject to any disclaimer, the term of this patent is extended or adjusted under 35 U.S.C. 154(b) by 315 days.

(21) Appl. No.: 15/585,436

(22) Filed: May 3, 2017

(65) Prior Publication Data
US 2018/0323624 A1   Nov. 8, 2018

(51) Int. Cl.
| H02J 7/00 | (2006.01) |
| G06F 1/26 | (2006.01) |
| H02J 7/06 | (2006.01) |
| H02J 7/10 | (2006.01) |

(52) U.S. Cl.
CPC ............ *H02J 7/0068* (2013.01); *G06F 1/263* (2013.01); *H02J 7/06* (2013.01); *H02J 2007/10* (2013.01)

(58) Field of Classification Search
CPC ........ H02J 7/0068; H02J 7/06; H02J 2007/10; G06F 1/263
USPC .......................................... 320/112, 140, 163
See application file for complete search history.

(56) References Cited

U.S. PATENT DOCUMENTS

| 7,595,609 | B2 | 9/2009 | Wang et al. |
| 7,717,601 | B2 | 5/2010 | Tan et al. |
| 7,876,058 | B2 | 1/2011 | Price et al. |
| 8,307,222 | B2 | 11/2012 | Wang et al. |
| 8,638,288 | B2 | 1/2014 | Taylor et al. |
| 8,847,874 | B2 | 9/2014 | Price et al. |
| 8,994,346 | B2 | 3/2015 | Rahardjo et al. |
| 9,213,385 | B2 | 12/2015 | Berke et al. |
| 9,466,974 | B2 | 10/2016 | Hsieh et al. |
| 2012/0235823 | A1* | 9/2012 | Trock ............... H01M 10/48 340/636.1 |

OTHER PUBLICATIONS

Intersil Knowledgebase, "What Does the Term Narrow VDC (NVDC) Mean?", Printed from Internet Jan. 17, 2017, 1 pg.

* cited by examiner

*Primary Examiner* — Edward Tso
*Assistant Examiner* — Aaron Piggush
(74) *Attorney, Agent, or Firm* — Egan Peterman Enders Huston

(57) ABSTRACT

Circuits, systems and methods that may be implemented to achieve thermal management for system load components by balancing power between multiple input power current paths for a narrow voltage DC (NVDC) circuit architecture coupled to receive input external DC power, e.g., such as provided by an external AC adapter. At least one of the multiple current paths may be coupled to supply DC power to a lower voltage portion of a system load through a charger circuit, while at least one other of the multiple current paths may be coupled to selectably supply DC power directly to another and different higher voltage portion of the system load, bypassing the charger circuit and related NVDC components.

20 Claims, 7 Drawing Sheets

CIRCUITS, SYSTEMS AND METHODS FOR BALANCING POWER FOR SYSTEM LOAD COMPONENTS

FIELD

This invention relates generally to powering system loads and, more particularly, to balancing power for system load components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

FIG. 1 illustrates a block diagram of a conventional portable information handling system 100. As shown in FIG. 1, information handling system 100 includes a charger circuit 160 and smart battery pack 165 that are coupled in a narrow voltage DC (NVDC) circuit architecture to selectably supply power 115 through a common power node (B+) to various components of a system load 120. Components of system load 120 include a host programmable integrated circuit (e.g., CPU) 105 coupled to receive regulated power via a buck converter or voltage regulator (VR) $142_1$, system memory (DRAM) 116 coupled to receive regulated power via a buck VR $142_2$, embedded controller (EC) 180 coupled to receive power via a buck VR $142_3$ and other possible power-consuming components 135 (storage drives, non-volatile memory, network interface controller, etc.) that are each coupled to receive regulated power from a respective buck VR 142, which are represented by three dots and buck VR $142_N$. As shown, system load 120 also includes a display device 125 (e.g., LED, OLED or LCD touch screen or video monitor display) that employs backlight circuitry coupled to receive regulated power via a boost converter or VR 140 for illuminating a display panel in order to display visual images and information to a user. As shown, separate components of system load 120 are communicatively coupled together by a digital data communication bus 187.

As shown in FIG. 1, embedded controller (EC) 180 is coupled to charger circuit 160 and battery pack 165 by system management bus (SMBus). Charger circuit 160 is coupled via an input power switch 170 to an external AC adapter 155 that receives power from AC mains 150. As shown, AC adapter 155 is removably coupled to, and separable from, charger circuit 160 of information handling system 100 at mating interconnection terminals in order to provide information handling system 100 with a source of DC power to supplement DC power provided by battery cells 124 of a battery system in the form of the smart battery pack 165, e.g., lithium ion ("Li-ion") or nickel metal hydride ("NiMH") battery pack including one or more rechargeable batteries and a battery management unit (BMU) 166 that includes an analog front end ("AFE") and microcontroller. As shown, a battery system data bus (SMBus) is also coupled to smart battery pack 165 to provide battery state information, such as battery voltage and current information, from BMU 166 of smart battery pack 165 to EC 180. Charger circuit 160 of information handling system 100 may also provide DC power for recharging battery cells of the battery system 165 during charging operations. A battery charging switch 181 is coupled as shown to allow charger circuit 160 to control battery charging current provided to battery cells 124. BMU 166 is coupled to current sense resistor 190, and is coupled to control charging of battery cells 124 by battery pack current switch 184 to control flow of charge current to battery cells 124 of battery pack 165, and to also control flow of discharge current from battery cells 124 of battery pack 165. In the case where battery pack 165 is replaceable, mating interconnection terminals may be provided as shown for coupling battery pack 165 to exchange current with charger circuit 160 and system load 120, and to exchange SMBus signals with EC 180.

FIG. 2 illustrates a more detailed view of a conventional arrangement of charger circuit 160 coupled to smart battery pack 165 and system load 120 in a NVDC architecture. As shown, DC IN power is provided at 20 volts DC via input power switch circuit 170 to charger circuit 160, which includes a charger chip or integrated circuit (IC) 209 that monitors total input current (and power) using current sense resistor 103. The 20 volt DC IN power is provided as shown to switch circuit 110 that includes a high side metal oxide semiconductor field effect transistor (MOSFET) that is switched on and off by charger IC 209 to provide switched current to inductor (choke) 119 in order to step down the 20 volt DC IN power to the voltage of battery cells 124, which in this case is 8.4 volts. This stepped down DC IN power is provided with output power from battery cells 124 to the common power node B+ which feeds power 115 to all voltage regulators (VRs), i.e., the buck VRs 142 and boost VR of system load 120. Thus, all system power and battery charging power is sourced from the high side MOSFET and inductor 119, and all system VR's 140 and 142 are sourced by power 115 from common power node B+. Each VR transfers the 8.4 volt power level to a voltage level that each power-consuming component of system load 120 requires. To illustrate, buck VRs 142 may each step down or reduce the 8.4 voltage level of power 115 to a lower voltage level (e.g., 1.8 volts) for system load components of FIG. 1 such as CPU/PCH 105, memory 116 and EC 180, while boost VR 140 steps up or increases the 8.4 voltage of power 115 to a higher voltage level (e.g., 37.2 volts) for backlight circuitry of display 125 of the system load of FIG. 1.

In the conventional system arrangement of FIGS. 1 and 2, all system power and battery charging power is stepped down to 8.4 volts and sourced through high-side MOSFET of switch circuit 110 and inductor 119 as shown. High-side MOSFET of switch circuit 110 and inductor 119 create more heat with more current and require thermal management to force temperature down by reducing system power using CPU throttling which reduces system performance, or by reducing charging current to battery cells 124 which increases required battery charging time. Mechanical cooling solutions are also employed, such as heat pipes and graphite sheets.

SUMMARY

Disclosed herein are circuits, systems and methods that may be implemented to achieve thermal management for system loads by balancing power between multiple input power current paths coupled to receive input external DC power, e.g., such as provided by an external AC adapter. At least one of the multiple current paths may be coupled to supply DC power to a lower voltage portion of a system load through a charger circuit (e.g., including high side MOSFET and inductor of a NVDC charging architecture), while at least one other of the multiple current paths may be coupled to supply DC power directly to another and different higher voltage portion of the system load, bypassing the charger circuit and related NVDC components (e.g., including high side MOSFET and inductor). Examples of information handling systems having NVDC charging architectures include, but are not limited to, with which the disclosed circuits, systems and methods may be employed include, but are not limited to, battery-powered information handling systems such as notebook computers, 2-in-1 or convertible computers, tablet computers, cell phones, smart phones and other mobile electrical devices.

In one exemplary embodiment, multiple DC input power current paths of an information handling system may be employed to control and limit the total DC current flowing through a high side MOSFET and power choke (inductor) of a NVDC charging architecture without sacrificing battery charging performance, while at the same time improving efficiency of higher voltage power-consuming component/s of a system load of the information handling system by providing input DC power directly to the higher voltage power-consuming component/s in a manner that bypasses the high side MOSFET and inductor of a NVDC charging architecture so as to control (i.e., limit or reduce) the concentrated heat generated by these NVDC components. In this regard, the current flow (and power transfer) through the high side MOSFET and inductor of a NVDC charger circuit may be actively controlled to manage heat generated by these components, while simultaneously providing power efficiency for the higher voltage power-consuming component/s. In one exemplary embodiment, the disclosed circuits, systems and methods may be implemented to provide an operating mode in which only power for lower voltage power-consuming components (e.g., that have an input voltage requirement less than the system DC IN voltage) is stepped down from the DC IN voltage of power received from an external power source, while only power for higher voltage power-consuming components (e.g., that have an input voltage requirement greater than the system DC IN voltage) is boosted to a voltage level above the DC IN voltage of power received from an external power source.

In another exemplary embodiment, the disclosed circuits, systems and methods may be implemented in a thin-type information handling system (e.g., thin notebook computers, convertible computers, tablets, cell phones, etc.) to reduce NVDC component heat generation and thus allow reductions in space and z-height dimensions for such systems beyond the limits possible with systems that employ conventional single input power path NVDC architectures due to heat generation from NVDC components in such conventional systems. This, in turn allows thinner thermal solutions for systems such as cell phones, while at the same time using low current profile power-consuming components to reduce system stack up size. In this regard, thermal management is a challenge for thin type system product designs since system overall performance is also limited by thermal condition, such as Intel dynamic platform and thermal framework (DPTF). Thus, in one embodiment, the disclosed system and methods may be implemented with lower power/current/derating profile.

In yet another exemplary embodiment, multiple DC input power current paths of an information handling system using a NVDC charging architecture may be employed to allow increased system performance for a given system physical size when compared to systems of the same physical size (e.g., interior chassis space and/or z-height) that employ conventional single input power path NVDC architectures. As an illustrative example, the disclosed multiple DC input power current paths may be implemented to reduce hot spot temperature by about 5° C. at the high side MOSFET and by about 2.5° C. at the choke of a NVDC charger architecture without any system z-height impact compared to an information handling system employing a conventional single input power path to a NVDC charger architecture. With such hot spot temperature reduction, the central processing unit (CPU) turbo boost time may be further extended beyond that possible for a system employing the conventional single path NVDC charger configuration.

In one respect, disclosed herein is circuitry, including: a charger circuit having a charger input coupled to receive input direct current (DC) power having an input DC voltage from an external power source, and a charger output coupled to provide output DC power having an output DC voltage that is less than the input DC voltage to a first power node; a system load including power-consuming components, all of the power-consuming components of a first portion of the system load having an input voltage requirement that is higher than an input voltage requirement of all the power-consuming components of a second portion of the system load; and a multiplexer switch having first and second multiplexer inputs and a multiplexer output coupled to provide power to the power-consuming components of the first system load portion, the first multiplexer input coupled to receive power from the first power node, and the second multiplexer input coupled to receive power from a second power node coupled between the external power source and the charger input. The power-consuming components of the second system load portion may be coupled to receive power only from the first power node.

In another respect, disclosed herein is a battery-powered information handling system, including: a display panel; at least one programmable integrated circuit coupled to provide signals to display visual images on the display panel; a system load including power-consuming components, all of the power-consuming components of a first portion of the system load having an input voltage requirement that is higher than an input voltage requirement of all the power-consuming components of a second portion of the system load, where the power-consuming components of the first portion of the system load includes backlight circuitry for the display panel, and where the power-consuming components of the second portion of the system load includes the programmable integrated circuit; one or more battery cells coupled to provide power to the power-consuming components of the system load through a first power node; a narrow voltage DC (NVDC) charger circuit having a charger input coupled to receive input direct current (DC) power having an input DC voltage from an external power source, and a charger output coupled to provide output DC power having an output DC voltage that is less than the input DC voltage to the first power node and to the battery cells as battery charging power; and a multiplexer switch having first and second multiplexer inputs and a multiplexer output coupled to provide power to the power-consuming components of the first system load portion, the first multiplexer input coupled to receive power from the first power node, and the second multiplexer input coupled to receive power directly from a second power node coupled between the external power source and the charger input. The power-consuming components of the second system load portion may be coupled to receive power only from the first power node.

In another respect, disclosed wherein is a method, including: operating a system load including power-consuming components, all of the power-consuming components of a first portion of the system load having an input voltage requirement that is higher than an input voltage requirement of all the power-consuming components of a second portion of the system load; using a charger circuit to receive input direct current (DC) power having an input DC voltage from an external power source, and to provide output DC power having an output DC voltage that is less than the input DC voltage to a first power node; always using power from the first power node to provide power to the power-consuming components of the second system load portion; and switching power for the power-consuming components of the first system load portion in real time between the first power node and a second power node that is coupled between the external power source and the charger input.

DESCRIPTION OF ILLUSTRATIVE EMBODIMENTS

Figure 3:
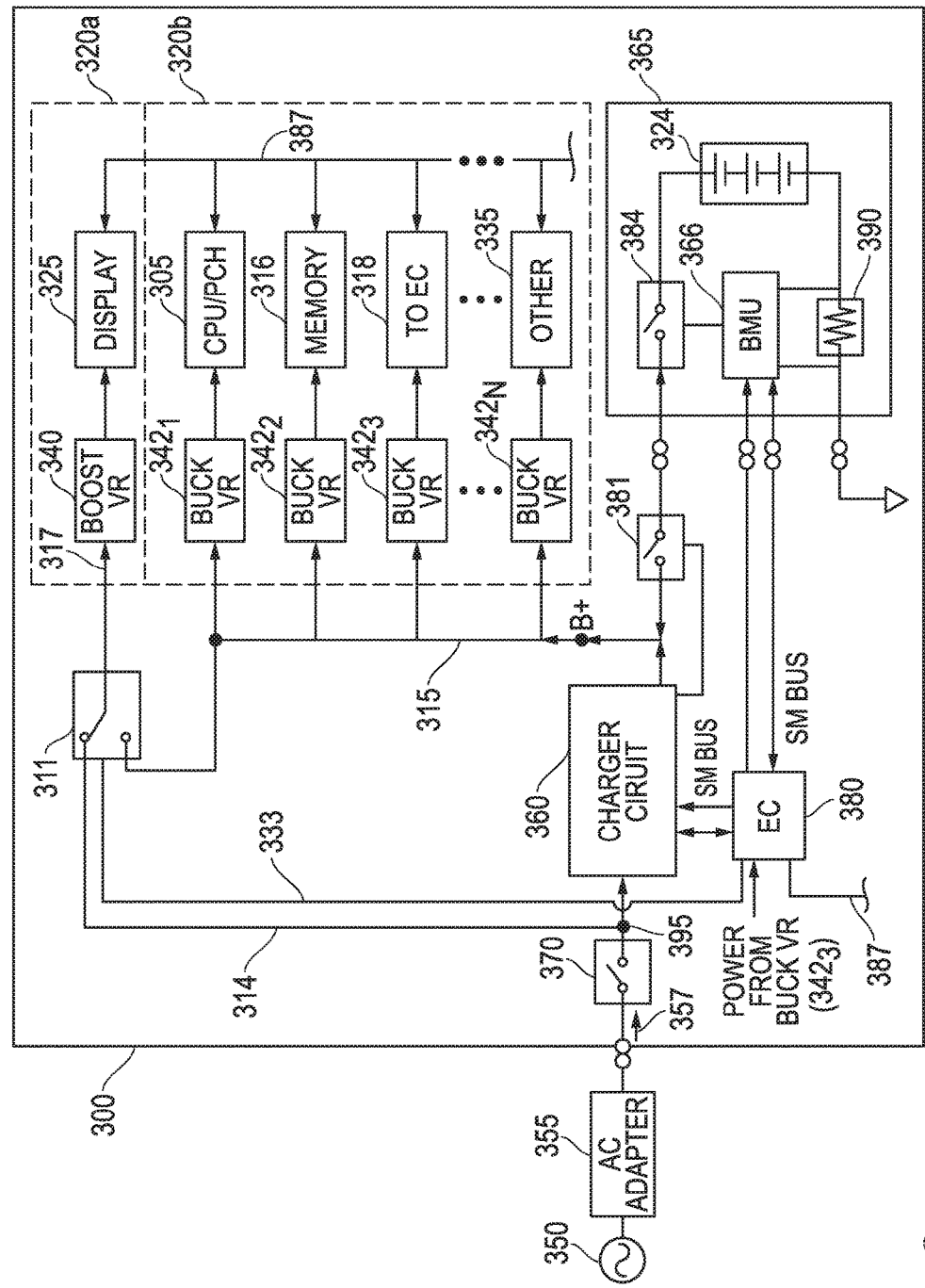
FIG. 3 illustrates a block diagram of a portable information handling system according to one exemplary embodiment of the disclosed circuits, systems and methods.

FIG. 3 illustrates a block diagram of a portable information handling system 300 according to one exemplary embodiment. As shown in FIG. 3, information handling system 300 includes a charger circuit 360 that is coupled via an input power switch 370 to an external power source, e.g., AC adapter 355 that receives power from AC mains 350, although an external power source may be any other type of power source capable of supplying input DC power to system 300. Input power switch 370 may be present, for example, to to block input current when appropriate and to perform soft start when external DC IN power is plugged in to system. Input power switch includes two p-channel MOSFETS coupled as shown to prevent input power overvoltage and reverse current flow. As shown, AC adapter 355 is removably coupled to, and separable from, charger circuit 360 of information handling system 300 at mating interconnection terminals in order to provide information handling system 300 with a source of DC power (e.g., of 20 volts or other suitable greater or lesser voltage) to supplement DC power provided by battery cells 324 of a battery system in the form of the smart battery pack 365, e.g., lithium ion ("Li-ion") or nickel metal hydride ("NiMH") battery pack including one or more rechargeable batteries and a battery management unit (BMU) 366 that includes an analog front end ("AFE") and microcontroller. Embedded controller (EC) 380 is coupled to charger circuit 360 and battery pack 365 by system management bus (SMBus). SMBus provides battery state information, such as battery voltage and current information, from BMU 366 of smart battery pack 365 to EC 380. Further information about architecture and operation of charger circuits and BMUs may be found, for example, in U.S. Pat. No. 8,307,222, which is incorporated herein by reference in its entirety for all purposes.

In the embodiment of FIG. 3, charger circuit 360 of information handling system 300 may also provide DC power for recharging battery cells of the battery system 365 during charging operations. A battery charging switch 381 may be coupled as shown to allow charger circuit 360 to control battery charging current provided to battery cells 324. BMU 366 is coupled to current sense resistor 390, and is coupled to control charging of battery cells 324 by battery pack current switch 384 (e.g., including charge MOSFET "C-FET" and discharge MOSFET "D-FET" coupled in series) to control flow of charge current to battery cells 324 of battery pack 365, and to also control flow of discharge current from battery cells 324 of battery pack 365. In the case where battery pack 365 is replaceable, mating interconnection terminals may be provided as shown for coupling battery pack 365 to exchange current with charger circuit 360 and a system load 320, and to exchange SMBus signals with EC 380. As shown in FIG. 3, separate components of system load 320 may be communicatively coupled together by communication media such as a digital data communication bus 387, e.g., to transfer data, digital signals and/or control signals between the separate power-consuming components.

In the embodiment of FIG. 3, charger circuit 360 and smart battery pack 365 (e.g., including two series one parallel "2S1P" or two series two parallel "2S2P" arrangement of battery cells 324) are coupled in a narrow voltage DC (NVDC) circuit architecture to supply lower voltage power based on the output voltage of the battery cells 324 (e.g., 2S2P configuration of 4.2 volt battery cells=8.4 volts) through a common power node (B+) and current path 315 to a lower voltage portion 320*b* of power-consuming components of a system load 320. By "lower voltage" it is meant that each of the power-consuming components of system load portion 320*b* has an input voltage requirement that is less than an input voltage requirement of one or more power-consuming components of a higher voltage portion 320*a* of system load 320*b*, i.e., power-consuming component/s of a higher voltage portion 320*a* have an input voltage requirement that is relatively higher than the input voltage requirement of power-consuming component/s of a lower voltage portion 320*b*. In a further embodiment, power-consuming components of lower voltage system load portion 320*b* may be characterized as having an input voltage requirement that is less than the voltage of power supplied by the NVDC circuit architecture through common power node (B+) and current path 315, while at the same time power-consuming components of higher voltage system load portion 320a may be characterized as having an input voltage requirement that is greater than the voltage of power supplied by the NVDC circuit architecture through common power node (B+) and current path 315. It will be understood that voltage of lower voltage power provided through a common power node (B+) may in other embodiments be greater or lesser than 8.4 volts, and may be determined by the particular types and configuration of battery cells 324.

Specifically, in the embodiment of FIG. 3, lower voltage power-consuming components of portion 320b include a host processor (e.g., CPU) 305 coupled to receive regulated power (e.g., 37.2 volts) via a buck converter or voltage regulator (VR) $342_1$, system memory (e.g., dynamic random access memory "DRAM", non-volatile random access memory "NVRAM", etc.) 316 coupled to receive regulated power (e.g., 1.8/1.2 volts) via a buck VR $342_2$, embedded controller (EC) 380 coupled to receive regulated power (e.g., 1.8 volts) via a buck VR $342_3$ and other possible lower voltage power-consuming components 335 (storage drives, non-volatile memory, network interface controller, etc.) that may be each coupled to receive regulated power (e.g., of less than about 8.4 volts) from a respective buck VR 342, which are represented by three dots and buck VR $342_N$. Thus, each of buck VRs 342 steps down or reduces input voltage (e.g., 8.4 volts) of power from common power node (B+) to an output voltage corresponding to the power requirements of its associated lower voltage power consuming component. It will be understood that the voltage, number and/or types of lower voltage system load components may vary, and that fewer, additional, and/or other types of lower voltage power-consuming components may be present in other embodiments.

As further shown in FIG. 3, higher voltage portion 320a of system load 320 of information handling system 300 includes at least one higher voltage power consuming component that is selectably powered by higher voltage input current (in this case DC IN power 357 of 20 volts DC received from AC adapter 355) via a current path 314 that is coupled to a DC IN power node 395 between AC adapter 355 and the input side of charger circuit 360, i.e., in a manner such that the that the higher voltage input current bypasses charger circuit 360 and its NVDC components (e.g., including high side MOSFET and inductor). In the embodiment of FIG. 3, the higher voltage power consuming component of higher voltage portion 320b is a display device 325 (e.g., LED, OLED or LCD touch screen or video monitor display) that employs backlight circuitry coupled to receive regulated power (e.g., of 37.2 volts) via a boost converter (or boost VR) 340 for illuminating a display panel in order to display visual images and information (e.g., provided as signals across digital data communication bus 387 from CPU 305) to a user. Boost VR 340 may be integrated with the display panel circuitry, or may be provided separate from display panel circuitry of information handling system 300.

In the illustrated embodiment, a power selection switch is present to perform power path rerouting by selectably switching input power 317 to boost VR 340 between higher voltage (e.g., 20 volts) power of current path 314 and lower voltage (e.g., 8.4 volts) power of current path 315. In either case boost VR 340 steps up or increases the supplied input voltage (e.g., either 20 volts or 8.4 volts) of power to a higher output voltage (e.g., 37.2 volts for a 6 serial and 8 parallel "6S8P" configuration of dual-type backlight LEDs in which 1s=6.2 volts or 37.2 volts for a 12S8P configuration of single-type backlight LEDs in which is=3.1 volts) corresponding to the power requirements of its associated higher voltage power consuming component, it being understood that input voltage requirement will vary with number and types of LEDs and/or other system load components that are present (e.g., 1S dual LEDs have 6.2 volt requirement, 1S single LEDs operate at 3.1 volts, etc.). Further information and examples of boost VRs and buck VRs may be found in U.S. Pat. No. 9,213,385, which is incorporated herein by reference in its entirety for all purposes. Further information and examples on driving backlights for display panels may be found, for example, in U.S. Pat. Nos. 8,638,288; 8,847,874; 7,876,058; and 7,717,601, each of which is incorporated herein by reference in its entirety for all purposes.

In one embodiment, display panel backlight boost VR 340 or other boost VR component of higher voltage system load portion 320a may be configured to accommodate a wide input voltage range, e.g., from about 5 volts to about 21 volts input voltage in the case of an example display panel backlight boost VR 340, thus allowing for direct DC IN input from different AC adapters 355 (e.g., including C-type adapters) having a wide range of different output voltages. As shown, EC 380 may be coupled by a control signal path 333, such as general purpose input output (GPIO) signals to control operation of power selection switching element or power multiplexer switch 311 which in this embodiment is a multi-input, single-output switch. However, other types of higher voltage system load components may be included within system load portion 320a, including components having a narrower or wider input voltage range.

A display panel backlight boost VR 340 may in one embodiment exhibit stable power consumption following with PWM duty cycle, and maximum power may be a constant number so that EC 380 may be programmed to readjust upper input current limit for charger circuit 360 charger current input limit accordingly as described further herein below. Moreover, EC 380 may also be programmed to determine whether power-balancing between current paths 314 and 315 is enabled or not at any given time, e.g., depending on the present voltage of DC IN power 357 (which may vary for power sources such as C-type adapters). In this regard, when power balancing is enabled, power for higher voltage system load portion 320a is sourced from DC IN power node 395 via current path 314. When power balancing is not enabled, power for higher voltage system load portion 320a is sourced together with power for lower voltage system load portion 320b from common power node B+ via current path 315. For example, in one embodiment EC 380 may determine to implement power balancing when display panel backlight 325 is ON, and DC IN power 357 of a defined voltage range is present (e.g., from about 5 volts to about 9 volts) from an AC adapter 355. In the same embodiment, EC 380 may determine not to implement power balancing when display panel backlight 325 is OFF, or when DC IN power 357 of the defined voltage range is either not present at all (e.g., AC adapter 355 is not connected or is not powered on), or when DC IN power 357 from an AC adapter 355 is not within the defined voltage range (e.g., DC IN power 357 is less than about 5 volts or greater than about 9 volts).

Figure 4A:
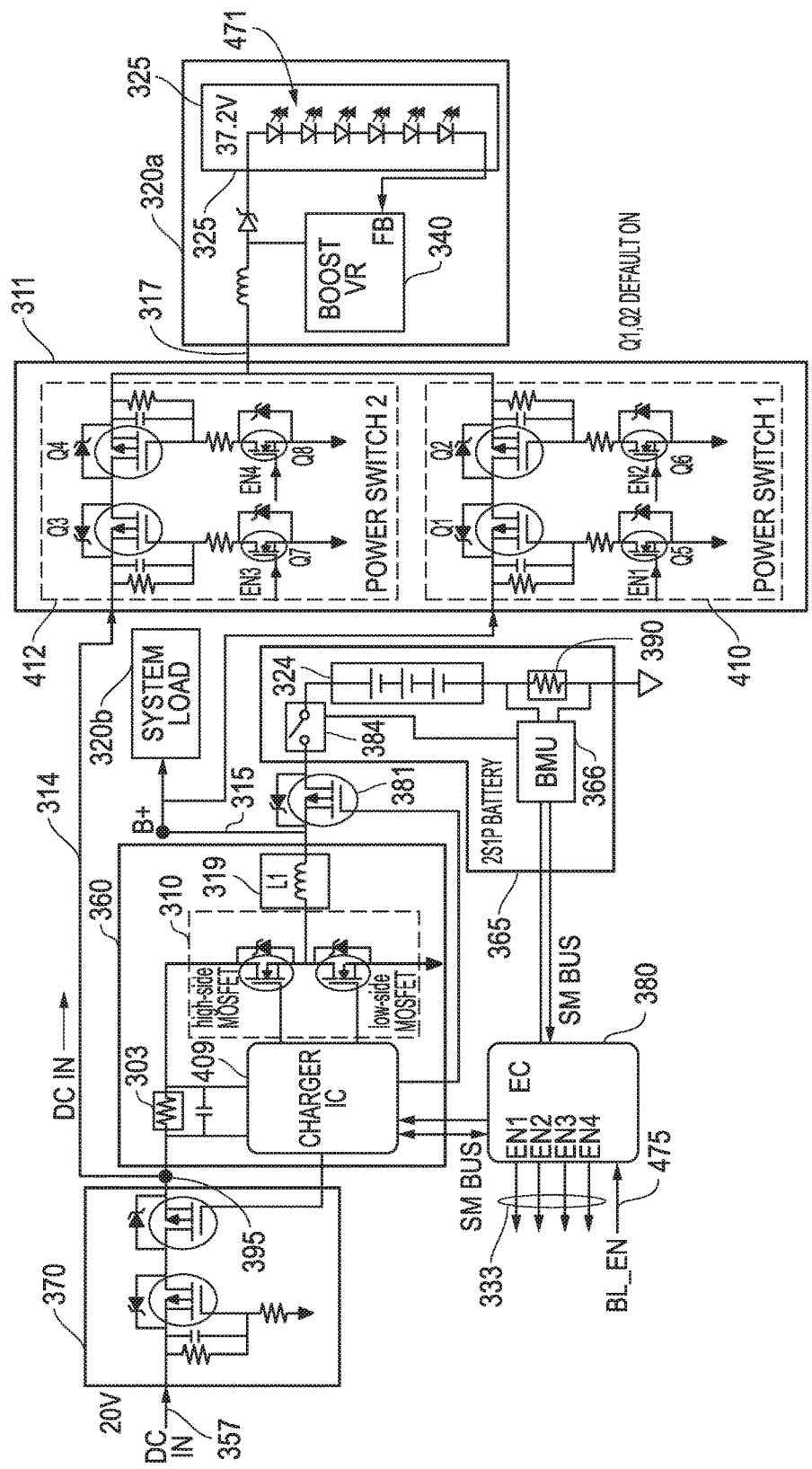
FIG. 4A illustrates a NVDC charging circuit architecture configured for power balancing between multiple current paths according to one exemplary embodiment of the disclosed circuits, systems and methods.

FIG. 4A illustrates a more detailed view of charger circuit 360 coupled to smart battery pack 365 and system load 320 in a NVDC architecture. As shown, DC IN power 357 (e.g., 20 volts) is provided via input power switch circuit 370 to charger circuit 360, which includes a charger integrated circuit (IC) 409 that monitors total input current (and total power) using current sense resistor 303 and compares this monitored value to an input current limit value provided by EC 380 to regulate maximum current passed through charger circuit 360. DC IN power 357 is provided as shown to switch circuit 310 that includes a high side metal oxide semiconductor field effect transistor (MOSFET) that is switched on and off by charger IC 409 to provide switched current to inductor (choke) 319 in order to step down DC IN power (e.g., 20 volts) to a lower voltage (e.g., 8.4 volts or other voltage corresponding to the particular battery cell configuration) of battery cells 324. This lower voltage power from charger circuit 360 is provided together with lower voltage power output from battery cells 324 to the common power node B+ which feeds lower voltage power via current path 315 to buck VRs 342 of lower voltage portion 320b of system load 320. This lower voltage power of current path 315 is also selectably fed under the control of a power selection switch 311 to boost VR 340 of higher voltage portion 320a of system load 320.

Thus, in the embodiment of FIG. 4A battery charging power (as well as power for buck VRs 342 and power-consuming components of lower voltage system load portion 320b) is always sourced from the high side MOSFET and inductor 319 of charger circuit 360 via lower voltage current path 315 from common power node B+. In this regard, voltage of common power node B+ may be set by charger IC or programmable integrated circuit 409 based on voltage of battery cell 324 configuration (e.g., where 1 S=4.2 volts, then 1S2P=4.2 volts, 2S2P=8.2 volts, 3S2P=12.6 volts, etc.). For example, in one embodiment, charger IC may set the output of charger circuit to a battery charging voltage that is slightly higher (e.g., such as from about 1% to about 5% higher, alternatively from about 2% to about 3% higher, alternatively about 2.4% to about 2.5% higher) than battery cell package voltage in order to ensure battery cells 324 may be charged to full capacity. Therefore in such an embodiment, for a 1S battery configuration then charger IC 409 sets B+ to be slightly higher than 4.2 volts (e.g., such as 4.3 volts), for a 2S battery configuration then charger IC 409 sets B+ to be slightly higher than 8.4 (e.g., such as 8.6 volts), for a 3S battery configuration then charger IC 409 sets B+ to be slightly higher than 12.6 (e.g., such as 13 volts), etc. It will be understood that the preceding voltage values are exemplary and that in other embodiments charger IC may set the output of charger circuit to a battery charging voltage that is higher than than battery cell package voltage by a greater or lesser amount or percent.

Each buck VR 342 of system load portion 320b further reduces the lower voltage power from current path 315 to a yet lower voltage level that each power-consuming component of system load portion 320b requires. As an example only, each buck VR 342 may further reduce a lower 8.4 voltage level of power from current path 315 to a yet lower voltage level (e.g., 1.8 volts) to power lower voltage system load components of system load portion 320b such as CPU/PCH 305, memory 316 and EC 380.

Still referring to FIG. 4A, input power 317 for boost VR 340 and power-consuming components of higher voltage system load portion 320a is selectably sourced under the control of power selection switch 311 from either DC IN power node 395 via higher voltage current path 314, or from high side MOSFET and inductor 319 of charger circuit 360 via lower voltage current path 315 from common power node B+. In either case, boost VR 340 of system load portion 320a increases voltage of input power 317 to a boost VR output voltage level that the consuming component of system load portion 320a requires. As an example only, boost VR 340 may increase voltage of input power 317 (either 8.4 volt power from current path 315 or 20 volt power from current path 314 as the case may be) to a higher voltage level (e.g., 37.2 volts) to power a higher voltage system load component 325 of system load portion 320a, which in this case is light-emitting diode backlight circuitry including multiple backlight light-emitting diodes (LEDs) 471 and LED driver circuit/s for illuminating a display panel. Other examples of suitable backlight circuity includes, but is not limited to, cold cathode fluorescent lamps (CCFLs), etc. Display panel backlight LEDs 471 may be provided in any suitable number and configuration depending on a given LED chip that is selected (e.g., a 6S8P LED configuration of dual (6.2 volt) LEDs in one example, a 12S8P configuration of single (3.1 volt) LEDs in another embodiment. etc.), and/or boost VR 340 may be provided with inductor and diode either separately from display panel backlight LEDs 471 (e.g., on a motherboard) or may be integrated with LEDs 471 in a LCD module. Further information and examples of backlights and backlight configurations for display panels may be found, for example, in U.S. Pat. Nos. 8,638,288; 8,847,874; 7,876,058; and 7,717,601, each of which is incorporated herein by reference in its entirety for all purposes.

In the exemplary embodiment of FIG. 4A, power selection switch 311 includes first and second power switches 410 and 412. First power switch 410 includes two p-channel enhanced MOSFETs Q1 and Q2 (having body diodes) that are coupled between current path 315 from common power node (B+) and power input 317 of higher voltage system load portion 320a that includes boost VR 340. MOSFETS Q1 and Q2 may be controlled together to selectably connect and disconnect power from current path 315 to power input 317 of system load portion 320a. In this regard, the gates of p-channel MOSFETs Q1 and Q2 may be selectably connected to ground by providing high enable signals EN1 and EN2 of control path 333 from EC 380 to independently turn ON respective n-channel MOSFETs Q5 and Q6 that are coupled between the gates of p-channel MOSFETs Q1 and Q2, respectively, as shown. This pulls down voltage on the gates of p-channel MOSFETs Q1 and Q2 through resistors to turn on power switch 410 to connect power from current path 315 to power input 317 of system load portion 320a. Conversely, the gates of p-channel MOSFETs Q1 and Q2 may be selectably disconnected from ground by providing low enable signals EN1 and EN2 from EC 380 to independently turn OFF respective n-channel MOSFETs Q5 and Q6. This raises voltage on the gates of p-channel MOSFETs Q1 and Q2 (by virtue of voltage coupled through resistor and capacitor from node B+ to the gate of p-channel Q1) to turn OFF power switch 410 to disconnect power from current path 315 to power input 317 of system load portion 320a.

In the embodiment of FIG. 4A, second power switch 412 employs a circuit architecture similar to first power switch 411, i.e., including two p-channel enhanced MOSFETs Q3 and Q4 that are coupled between current path 314 from DC IN power node 395 and power input 317 of higher voltage system load portion 320a that includes boost VR 340. MOSFETS Q3 and Q4 may be controlled together in a manner similar to MOSFETS Q1 and Q2 to selectably connect and disconnect power directly from current path 314 to power input 317 of system load portion 320a. In this regard, the gates of p-channel MOSFETs Q3 and Q4 may be selectably connected to ground by providing high enable signals EN3 and EN4 of control path 333 from EC 380 to independently turn ON respective n-channel MOSFETs Q7 and Q8 that are coupled between the gates of p-channel MOSFETs Q3 and Q4, respectively, as shown. This pulls down voltage on the gates of p-channel MOSFETs Q3 and Q4 through resistors to turn on power switch 412 to connect power from DC IN power node 395 to power input 317 of system load portion 320a. Conversely, the gates of p-channel MOSFETs Q3 and Q4 may be selectably disconnected from ground by providing low enable signals EN3 and EN4 from EC 380 to independently turn OFF respective n-channel MOSFETs Q7 and Q8. This raises voltage on the gates of p-channel MOSFETs Q3 and Q4 to turn OFF power switch 412 to disconnect power from current path 314 to power input 317 of system load portion 320a.

It will be understood that the particular circuit configuration of switching element 311 illustrated in FIG. 4A is exemplary only, and that any other configuration of switch circuitry (e.g., such as Schottky Diodes or power switch chip) may be employed that is suitable for selectably connecting a power input 317 of a higher voltage system load portion 320a to either one of lower voltage input power from current path 314 or higher voltage input power from current path 315 under the control of EC 380, or alternatively any other programmable integrated circuit's of system 300 (e.g., such as microprocessor or CPLD).

In operation of the embodiment of FIGS. 3 and 4A, switching element 311 may be controlled (e.g., by EC 380 via control path 333) to turn second power switch 412 ON and first power switch 410 OFF so as to provide DC IN back up by boost VR 340 in a multi-stage buck and then boost operation, but is rather stepped up in a single stage boost operation.

As an example only, assume a DC IN power voltage of 20 volts and a higher voltage system load portion 320a that includes a display panel backlight 325 that requires 37.2 volts input power and consumes 4 watts of power. Also assume battery cells 324 require 20 watts of battery charging power, and that power-consuming components of lower voltage system load portion 320b include CPU/PCH 305 that consumes 15 watts of power, memory 316 that consumes 1 watt of power, EC 380 that consumes 0.1 watts watts of power, battery charging 20 watts, and other components 335 that consume 8 watts of power. Thus, in this illustrative example, total battery charging and system load power requirement is a maximum of 45 watts when taken together with charging power of a constant current (CC) mode charge.

In one example, EC 380 may control power switch 311 to divert 2.8 watts of power for LCD module of backlight 325 away from charger circuit 360 and to direct current path 314 to reduce the amount of power flowing through high side MOSFET and inductor (choke) 319, which results in a reduction in operating temperature of the high side MOSFET, and a reduction in operating temperature of output inductor (choke) 319 of charger circuit 360 during heavy and light system load power conditions as shown in the example operating information in below Table 1.

TABLE 1

| Hot spot | Power transition | Heavy load | | | Light load | | |
|---|---|---|---|---|---|---|---|
| | | Charger output Choke Temperature | High-Side MOSFET Temperature | End to end Efficiency | Charger output Choke Temperature | High-Side MOSFET Temperature | End to end Efficiency |
| Conventional design | 20 V to 8.4 V to 37.2 V | 75.52 C. | 74.25° C | 87% | 39.54° C. | 37.57° C. | 86% |
| Power balancing | 20 V to 37.2 V | 71.63° C. | 71.23° C. | 93.80% | 36.16° C. | 35° C. | 93% |
| Improvement | | 3.89° C. | 3.02° C. | ~6.8% | 3.38° C. | 2.57° C. | ~7% |

Figure 1:
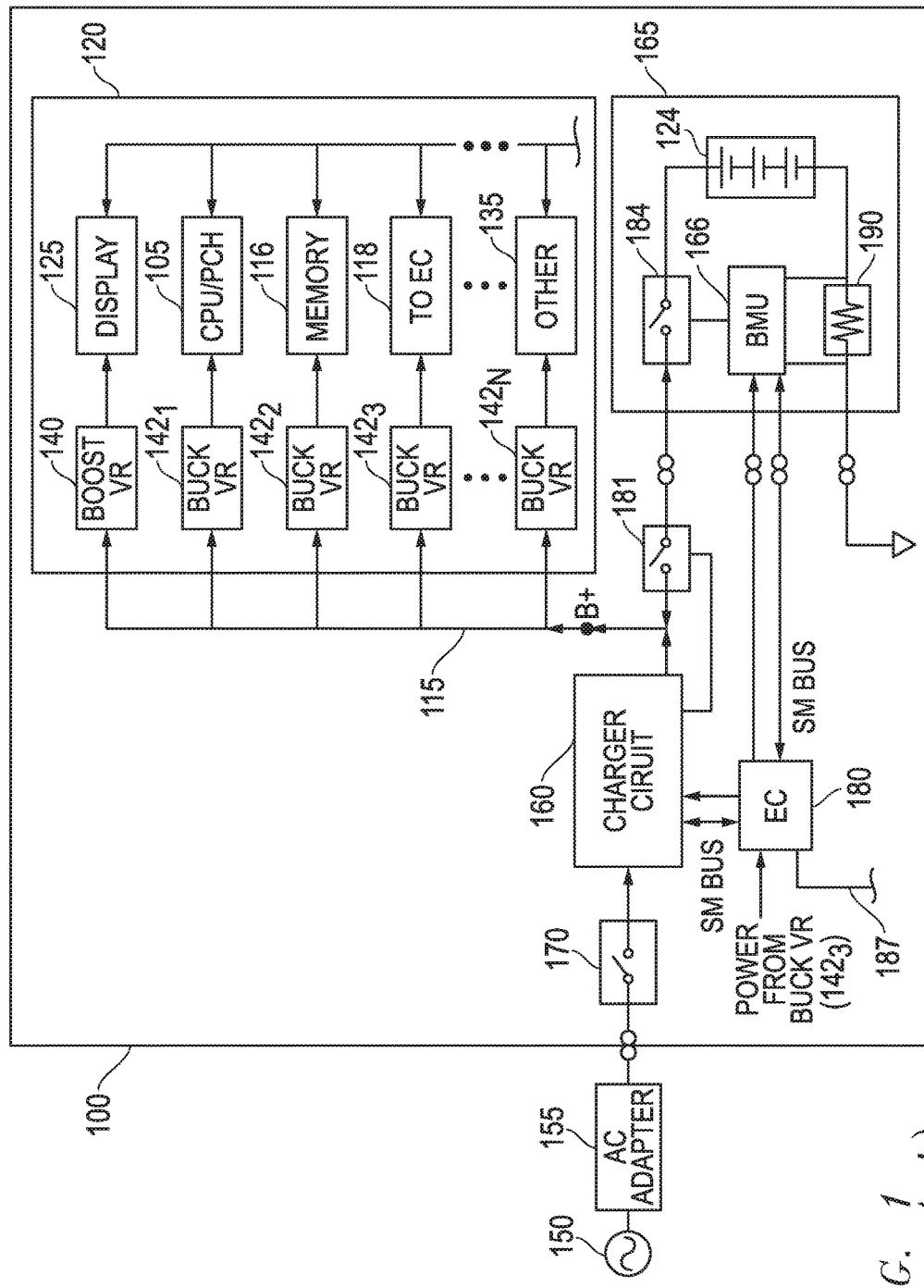
FIG. 1 illustrates a block diagram of a conventional portable information handling system.
Figure 2:
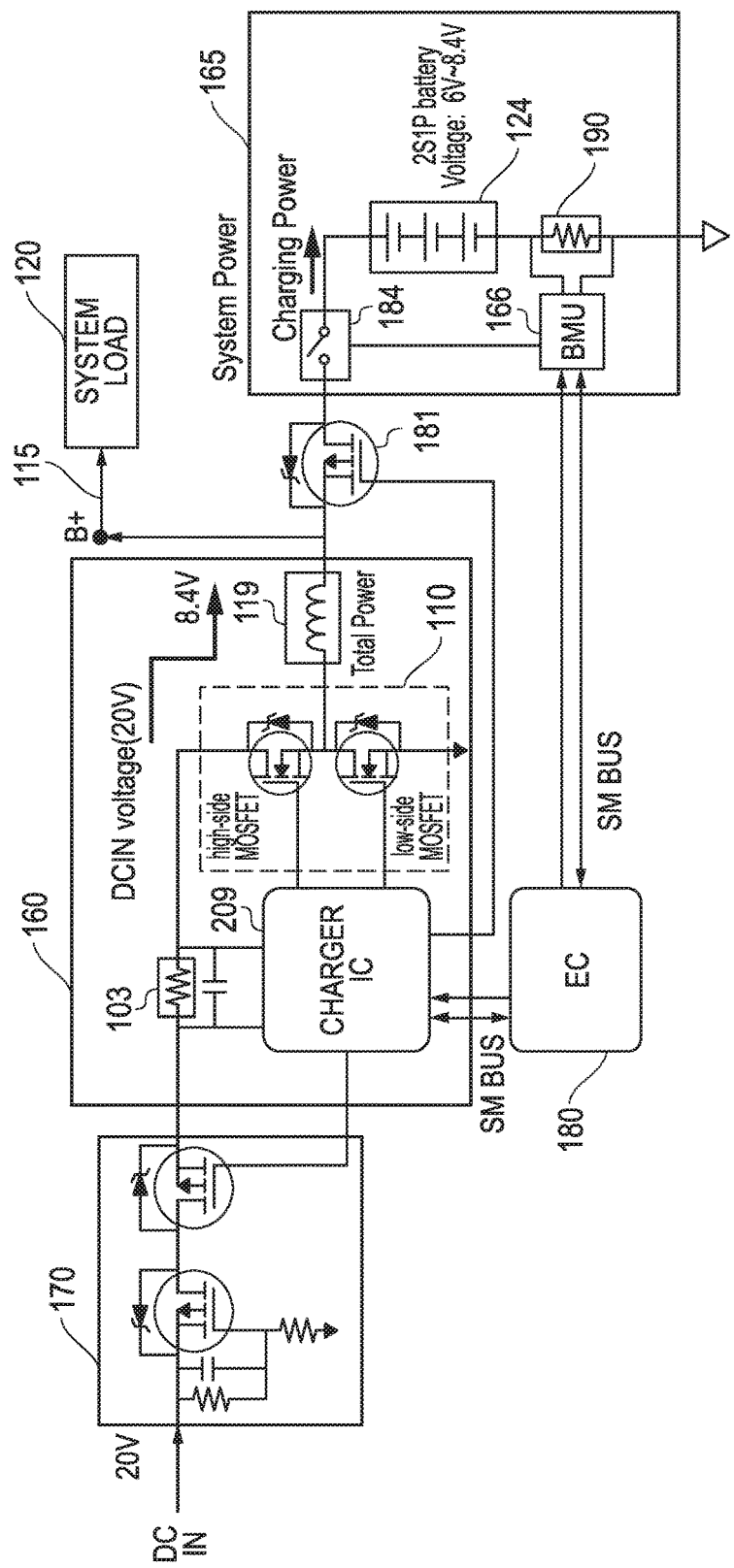
FIG. 2 illustrates a conventional arrangement of a NVDC charging circuit architecture

Table 1 Notes:
(a) Load information:
light load (28 W): system idle and charge battery
heavy load (45 W): system running under processing load and charge battery
(b) Panel backlight power: 2.87 Watts at 37.2 volts power 357 from an AC adapter 355 (when present and powered) as input power 317 to boost VR 340 of higher voltage system load portion 320a (e.g., a LCD backlight). Doing so re-routes power for higher voltage system load portion 320a away from charger circuit 360 and instead directly from DC IN power node 395 to higher voltage system load portion 320a via current path 314. This power path re-routing reduces the amount of power required to pass through high side MOSFET and choke 319 of charger circuit 360. Thus, heat generated by high side MOSFET and choke 319 is reduced when compared to conventional NVDC circuit architecture of FIGS. 1 and 2, in which high side MOSFET and inductor 119 of charger circuit 160 always handle all power for system load 120, including boost VR 140. At the same time, overall system power regulation efficiency is improved during operation of the embodiment of FIGS. 3 and 4A compared to the conventional NVDC circuit architecture of FIGS. 1 and 2, since the voltage of power provided to system load 320a is not required to be stepped down by charger circuit 360 before being boosted Moreover, under such operating conditions, power conversion efficiency for system load 320a may be increased (e.g., by 10% or 0.4 watts) since charger circuit 360 is not required to step down the 4 watt power supplied to system load 320a, meaning that in this example inductor 319 actually handles 4.4 watts less power than is handled by inductor 119 of the conventional NVDC circuit architecture of FIGS. 1 and 2 when powering a similar system load 320. In one embodiment, when EC 380 controls power switch 311 to transfer backlight panel power away from charger circuit 360 to current path 314, EC 380 may also transmit a command to charger circuit 360 over SMBus to set a new current limit for charger circuit 360, e.g., in the above example the new current limit setting will be 45 watts (total power)−4 watts (transferred power)=41 watts (new power limit at charger input side as measured at current sense resistor 303). At the same time, transferring 4 watts of power away from charger circuit 350 also improves power efficiency of display panel backlight 325 by 10% (i.e., from 80% to 90%). It will be understood that the foregoing values are exemplary and provided for purpose for illustration only, and will vary depending on the particular components and operating conditions of a given information handling system.

It will also be understood that the disclosed circuits, systems and methods may be implemented using any type and voltage of external power source besides the example 20 volt AC adapter described in relation to FIGS. 3 and 4A, including AC adapters having output voltages greater or less than 20 volts. For example, in one alternative embodiment, AC adapter 355 may be a type C power adapter that outputs DC IN power 357 of 5 volts to an information handling system 300 such as a cell phone, tablet computer, notebook computer, etc. In one such embodiment, charger circuit 360 may be a Power management integrated circuit (PMIC) that is coupled to receive the 5 volts DC IN power 357 and perform DC to DC conversion (e.g., including voltage stepdown to 4.2 volts) for lower voltage power-consuming components of system load 320 in manner as previously described. In such an embodiment, current path 314 may selectably provide DC power of 5 volts from DC IN power node 395 under the control of power selection switch 311 via current path 314 to higher voltage power-consuming components (e.g., boost VR 340 and 37.2 volts display panel backlight 325) of system load 320a, thus shifting power from high-side MOSFET and inductor 319 of charger circuit 360 to achieve temperature and efficiency advantages as previously described. As previously described, boost VR 340 may accommodate a wide range of input voltages, including multiple power source voltage levels (e.g., such as 5 volts, 9 volts, 15 volts, 20 volts, etc.) as DC IN power 357 through type C port.

Figure 5:
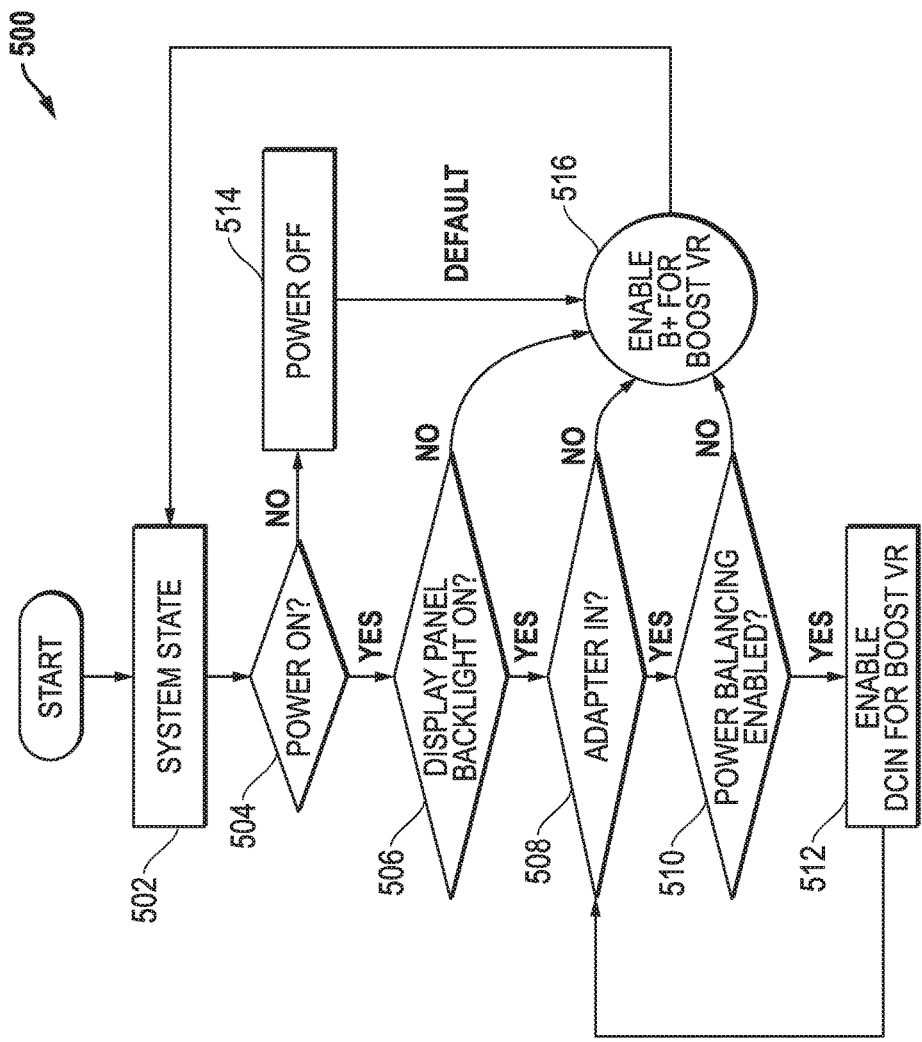
FIG. 5 illustrates methodology according to one exemplary embodiment of the disclosed circuits, systems and methods.

FIG. 5 illustrates one exemplary embodiment of a methodology 500 that may be implemented in real time to balance power delivered to power-consuming components 320 of an information handling system 300 between common power node B+ and DC IN power node 395. In one embodiment, methodology 500 may be implemented by EC 380 as described below in this example, although it may be alternatively by any other suitable programmable integrated circuit. As shown, methodology 500 starts by monitoring state of system 300 in step 502, with EC 380 powered ON by DC IN power 357 or power from battery cells 324. If it is determined in step 504 that system 300 is in powered OFF state 514 (e.g., CPU 305 is OFF), then EC 380 controls power switch 410 in step 516 to be ON and power switch 412 to be OFF so that power for all components of system load 320 is sourced from common power node B+ via current path 315. However, if system 300 is powered ON in step 504 (e.g., CPU 305 is powered ON and system BIOS is executing or has already executed with OS booted), then methodology 500 proceeds to step 506. In one exemplary embodiment, power ON state may also include any power saving states in which CPU 305 remains powered on (e.g., Idle mode, DOS mode and other modes that display panel backlight 325 is still ON).

In step 506 of FIG. 5 it is determined whether display panel backlight 325 is powered ON (active) or OFF (not active). In one embodiment CPU 305 may provide a GPIO signal BL_EN 375 to EC 380 to indicate the ON or OFF status of display panel backlight 325. If display panel backlight 325 is indicated to be powered OFF (not active) in step 506, then EC 380 controls power switch 410 in step 516 to be ON and power switch 412 to be OFF so that power for all components of system load 320 is sourced from common power node B+ via current path 315. However, if backlight 325 is indicated to be powered ON in step 506 (e.g., CPU 305 is powered ON and system BIOS is executing or has already executed with OS booted), then methodology 500 proceeds to step 508, where it is determined whether AC adapter 355 is connected and providing DC IN power 357. If in step 508 AC adapter is found not to be connected, or not to be providing DC IN power 357, then EC 380 controls power switch 410 in step 516 to be ON and power switch 412 to be OFF so that power for all components of system load 320 is sourced from common power node B+ via current path 315. However, if in step 508 AC adapter 355 is found to be connected and providing DC IN power 357, then methodology 500 proceeds to step 510 where it is determined whether to enable power balancing for power-consuming components of system load 320 between current path 314 from DC IN power node 395 and current path 315 from common power node B+.

It will be understood that criteria any suitable or desired additional criteria may be implemented in step 510 for whether or not to balance power between DC IN power node 395 and common power node B+. In one embodiment, monitored voltage of DC IN power 357 may be used as a power balancing criteria. For example, if DC IN power 357 is greater than or equal to a minimum power balancing voltage threshold (e.g., such as 5 volts DC IN for a 1S (B+: 4.2V) battery, or 9 volts DC IN for a 2S (B+ 8.4V) battery structure) then power balancing may be implemented in step 512 by EC 380 by turning ON power switch 412 and turning OFF power switch 410 to source power for higher voltage system load 320a from DC IN power node 395 via current path 314. However, if DC IN power 357 is less than the minimum power balancing voltage threshold then then EC 380 controls power switch 410 in step 516 to be ON and power switch 412 to be OFF so that power for all components of system load 320 is sourced from common power node B+ via current path 315. Methodology 500 may then repeat steps 508 to 512 for as long as system 300 remains powered ON, and continue to monitor status of DC IN power 357 (present or not present) from AC adapter 355. As further shown, methodology 500 may return from step 516 to step 502 and repeat. It will be understood that methodology 500 is exemplary only, and that any alternative combination of additional, fewer, and/or alternative steps may be performed in any order that is suitable for performing power balancing between DC IN power node 395 and common power node B+ based on one or more of overall system operating state, DC IN power characteristics, operating state of component/s of higher power system load 320a, and/or any other desired criteria.

Figure 6:
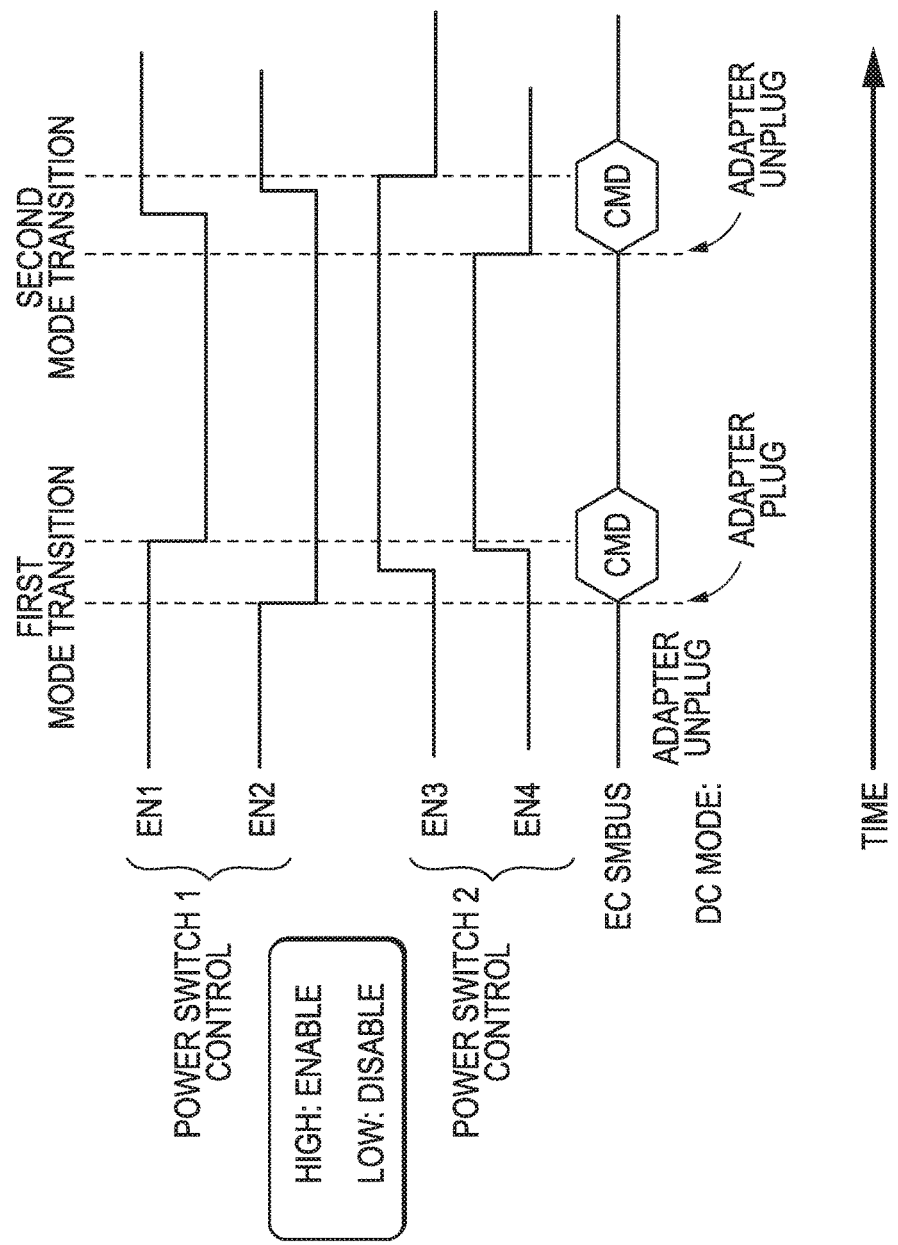
FIG. 6 illustrates control signal timing according to one exemplary embodiment of the disclosed circuits, systems and methods.

FIG. 6 illustrates control signal timing that EC 380 (or other suitable programmable integrated circuit) may employ for controlling operation of power switch components 410 and 412 of power selection switching element 311 in order to selectably enable and disable power balancing for system load 320, e.g., when transitioning between power balancing and non-power balancing mode, such as may occur during steps 508 to 512 of methodology 500 with change in state of DC IN power 357 provided by AC adapter 355 is detected at current sense resistor 303 by charger circuit 360 and reported via SMBus signals to EC 380.

As shown, a first mode transition is illustrated that occurs when it is detected that a powered AC adapter 355 is first plugged into system 300 while system 300 has been previously operating only on battery power from battery cells 324. As shown in FIG. 6 when no DC IN power 357 is provided from AC adapter 355, Q1 and Q2 of first power switch 410 are each ON by default (enable signals EN1 and EN2 both high) and Q3 and Q4 of second power switch 412 are each OFF (enable signals EN3 and EN4 both low) so that the selected power source for higher voltage system load 320a is common power node B+ via current path 315. When it is detected by current senses resistor 303 that AC adapter 355 is first plugged in and/or otherwise powered on from unpowered condition, a first mode transition then occurs if GPIO signal BL_EN from CPU 305 to EC 380 indicates display panel backlight 325 is ON (not active). In this first mode transition, Q1 and Q2 of first power switch 410 are each turned OFF by EC 380 (enable signals EN1 and EN2 both transition to low in the indicated sequence) and Q3 and Q4 of second power switch 412 are each turned ON (enable signals EN3 and EN4 both transition to high in the indicated sequence) so that the selected power source for higher voltage system load 320a is now DC IN power node 395 via current path 314. At the same time EC 380 sends a command (e.g., via SMBus signals) to charger circuit 360 to change input power limit for charger circuit 360 to reflect reduction in charger circuit output power due to transfer of power source for higher power system load 320a to direct current path 314 from DC IN power node 395.

Figure 4B:
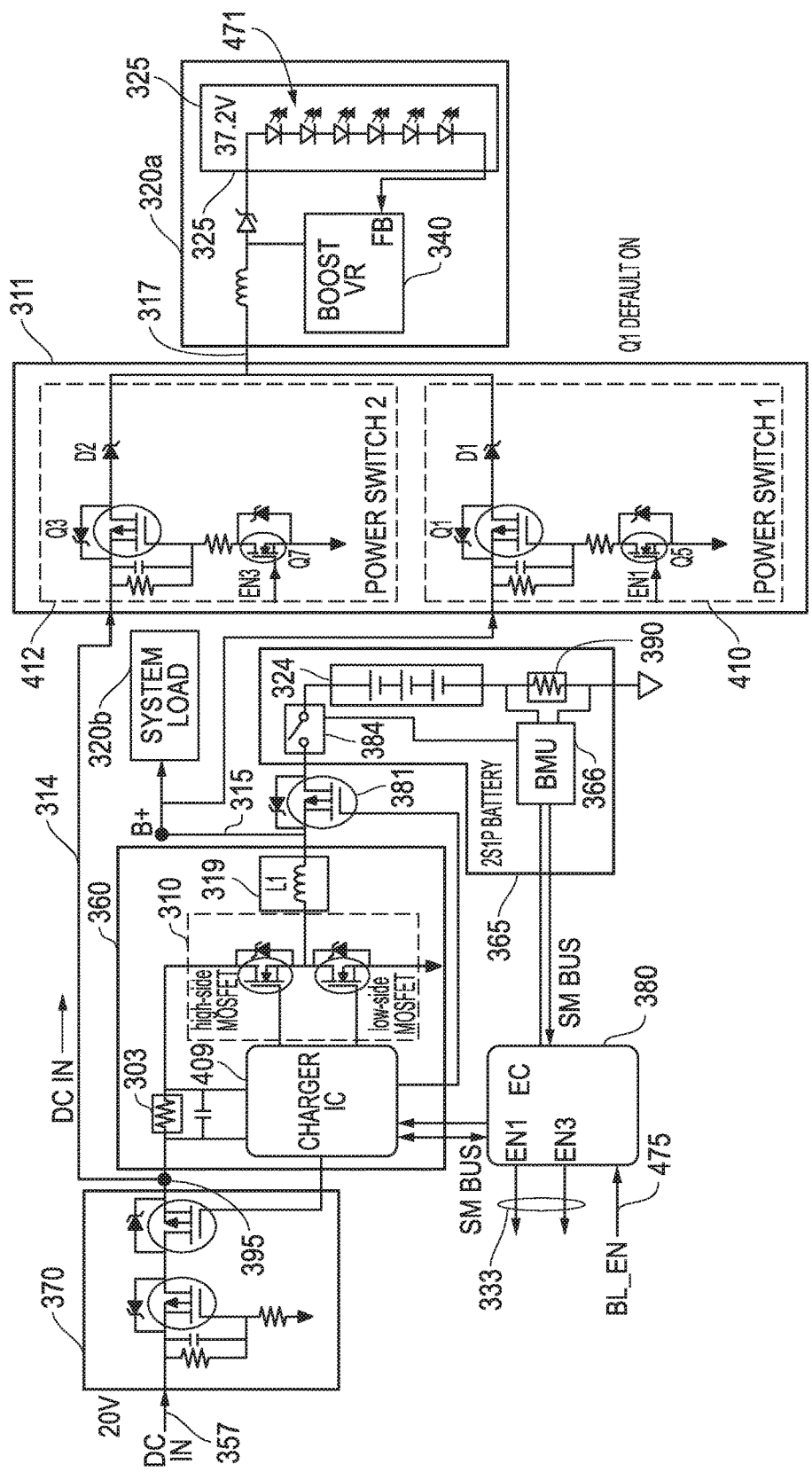
FIG. 4B illustrates a NVDC charging circuit architecture configured for power balancing between multiple current paths according to one exemplary embodiment of the disclosed circuits, systems and methods.

In one embodiment, enable signal EN2 is pulled low first as shown to turn OFF Q2 before providing high enable signals EN3 and EN4 to turn ON Q3 and Q4 in order to prevent high voltage current surge through body diode of Q2 from AC adapter 355 when first plugged in or otherwise powered during the first mode transition. At the same time, enable signal EN1 is held high until Q3 and Q4 are turned on in order to ensure a continuous supply of power to system load 320a during the first mode transition. In such an embodiment, four switches (i.e., Q1 and Q3, and Q2 and Q4) may be present to allow control of control power input using FETs Q1 and Q3, while using FETs Q2 and Q4 primarily for blocking reverse flow of power from the other power source by using their respective body diodes. In the embodiment of FIG. 4A, Q2 and Q4 may be switched ON once the power source transition is done. In one possible alternative embodiment illustrated in FIG. 4B, each of Q2 and Q4 may be replaced by a diode (D1 and D4, respectively) to always block reverse flow of power to the other path such that EN2 and EN4 control signals are not required. This alternative embodiment is illustrated in FIG. 4B. In the embodiment of FIG. 4B, additional power loss may occur on the diode.

Still referring to FIG. 6, a second mode transition is illustrated that occurs when it is detected by current sense resistor 303 that the powered AC adapter 355 is now unplugged from system 300 (or turned OFF) while system 300 has been previously operating with the powered adapter 355 plugged into system 300 supplying DC IN power 357 as described above. As shown, when adapter 355 stops supplying DC IN power 357, Q3 and Q4 of second power switch 412 are each turned OFF (enable signals EN3 and EN4 both transition to low in the indicated sequence) and Q1 and Q2 of first power switch 410 are each turned ON by EC 380 (enable signals EN1 and EN2 both transition to high in the indicated sequence) so that the selected power source for higher voltage system load 320a is now common power node B+ via current path 315. At the same time EC 380 sends a command (e.g., via SMBus signals) to charger circuit 360 to change input power limit for charger circuit 360 to reflect increase in charger circuit output power due to transfer of power source for higher power system load 320a to current path 315 from common power node B+. It will be understood that the adapter status of "plugged in" and "unplugged" as used in relation to FIG. 6 also refers to the status of an adapter that is connected to system 300 but powered ON in the first case and powered OFF in the second case.

It will be understood that one or more of the tasks, functions, or methodologies described herein for an information handling system or component thereof (e.g., including those described herein for components 305, 366, 380, 409, 340, 342, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such programmable integrated circuits may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a programmable integrated circuit may be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed circuits, systems and methods may be utilized in various combinations and/or independently. Thus the invention is not limited to only those combinations shown herein, but rather may include other combinations.

What is claimed is:

1. Circuitry, comprising:
   a charger circuit having a charger input which receives input direct current (DC) power having an input DC voltage from an external power source, and a charger output which provides output DC power having an output DC voltage that is less than the input DC voltage to a first power node;
   a system load comprising a first portion and a second portion, the first portion of the system load including one or more power-consuming components and the second portion of the system load including one or more power-consuming components, all of the power-consuming components of the first portion of the system load having an input voltage requirement that is higher than an input voltage requirement of all the power-consuming components of the second portion of the system load; and
   a multiplexer switch having first and second multiplexer inputs and a multiplexer output which provides power to the power-consuming components of the first portion of the system load, the first multiplexer input receiving power from the first power node, and the second multiplexer input receiving power from a second power node coupled between the external power source and the charger input;
   where the power-consuming components of the second portion of the system load receive power only from the first power node.

2. The circuitry of claim 1, where all of the power-consuming components of the first portion of the system load have an input voltage requirement that is higher than the input DC voltage from the external power source; and where all of the power-consuming components of the second portion of the system load have an input voltage requirement that is lower than the input DC voltage from the external power source.

3. The circuitry of claim 1, further comprising at least one programmable integrated circuit coupled to control the multiplexer switch to connect the multiplexer output to one of the first multiplexer input or the second multiplexer input at a time.

4. The circuitry of claim 1, where the external power source comprises an external AC adapter; and where the circuitry further comprises one or more battery cells which receive charging power from the charger circuit output, and which provide battery power to the first power node.

5. The circuitry of claim 1, further comprising one or more battery cells which receive charging power from the charger circuit output, and which provide battery power to the first power node; where the charger circuit output voltage is based on an output voltage of the one or more battery cells.

6. The circuitry of claim 1, where the power-consuming components of the first portion of the system load comprises a boost voltage regulator (VR); and where the power-consuming components of the second portion of the system load comprises a buck voltage regulator (VR).

7. A battery-powered information handling system, comprising:
   a display panel;
   at least one programmable integrated circuit coupled which provides signals to display visual images on the display panel;
   a system load comprising a first portion and a second portion, the first portion of the system load including one or more power-consuming components and the second portion of the system load including one or more power-consuming components, all of the power-consuming components of the first portion of the system load having an input voltage requirement that is higher than an input voltage requirement of all the power-consuming components of the second portion of the system load, where the power-consuming components of the first portion of the system load comprises backlight circuitry for the display panel, and where the power-consuming components of the second portion of the system load comprises the programmable integrated circuit;
   one or more battery cells which provide power to the power-consuming components of the system load through a first power node;
   a narrow voltage DC (NVDC) charger circuit having a charger input which receives input direct current (DC) power having an input DC voltage from an external power source, and a charger output which provides output DC power having an output DC voltage that is less than the input DC voltage to the first power node and to the battery cells as battery charging power; and
   a multiplexer switch having first and second multiplexer inputs and a multiplexer output which provides power to the power-consuming components of the first portion of the system load, the first multiplexer input receiving power from the first power node, and the second multiplexer input receiving power directly from a second power node coupled between the external power source and the charger input;
   where the power-consuming components of the second portion of the system load receive power only from the first power node.

8. The system of claim 7, where all of the power-consuming components of the first portion of the system load have an input voltage requirement that is higher than the input DC voltage from the external power source; and where all of the power-consuming components of the second portion of the system load have an input voltage requirement that is lower than the input DC voltage from the external power source.

9. The system of claim 7, where the at least one programmable integrated circuit provides data to display visual images on the display panel is a host processor; where the multiplexer switch comprises a first power switch coupled between the first multiplexer input and the multiplexer output and a second power switch coupled between the second multiplexer input and the multiplexer output; and where the information handling system further comprises an embedded controller coupled to control the timing of each of the first power switch and the second power switch to connect the multiplexer output to only the first multiplexer input when it is detected by at least one programmable integrated circuit of the information handling system that the input DC voltage is not being supplied from the external power source to the second power node, and to connect the multiplexer output to only the second multiplexer input when it is detected it is detected by at least one programmable integrated circuit of the information handling system that the input DC voltage is being supplied from the external power source to the second power node.

10. The system of claim 9, where the charger circuit comprises a current sense resistor coupled to the charger input, and at least one programmable integrated circuit coupled to the embedded controller that is programmed to use the current sense resistor to monitor total input current at the charger input; where the embedded controller is programmed to determine an input current limit value based on whether the multiplexer output is coupled to the first multiplexer input or the second multiplexer input, and provide the determined input current limit to the at least one programmable integrated circuit of the charger circuit; and where the at least one programmable integrated circuit of the charger circuit is programmed to regulate maximum current passed through charger circuit based on the monitored total input current and the determined input current limit value provided by embedded controller; where the determined input current limit value provided by the embedded controller is greater when the multiplexer output is coupled to the first multiplexer input than when the multiplexer output is coupled to the second multiplexer input.

11. The system of claim 7, where the at least one programmable integrated circuit provides data to display visual images on the display panel is a host processor; where the multiplexer switch comprises a first power switch coupled between the first multiplexer input and the multiplexer output and a second power switch coupled between the second multiplexer input and the multiplexer output; and where the information handling system further comprises an embedded controller coupled to control the timing of each of the first power switch and the second power switch based at least in part on the activity state of the display panel backlight circuitry and the state of input DC voltage from the external power source detected by at least on programmable integrated circuit of the information handling system to:
  connect the multiplexer output to only the first multiplexer input only when it is detected that the input DC voltage is not being supplied from the external power source to the second power node or when the host programmable integrated circuit indicates to the embedded controller that display panel backlight circuitry is not active, and
  connect the multiplexer output to only the second multiplexer input only when it is detected that the input DC voltage is being supplied from the external power source to the second power node at the same time that the host programmable integrated circuit indicates to the embedded controller that the display panel backlight circuitry is active.

12. The system of claim 7, where the external power source comprises an external AC adapter; and where the charger circuit output voltage is based on an output voltage of the one or more battery cells.

13. The system of claim 7, where the power-consuming components of the first portion of the system load comprises a boost voltage regulator (VR) coupled between the multiplexer output and the backlight circuitry for the display panel; and where the power-consuming components of the second portion of the system load comprises a buck voltage regulator (VR) coupled between the first power node and the at least one programmable integrated circuit.

14. A method, comprising:
  operating a system load comprising a first portion and a second portion, the first portion of the system load including one or more power-consuming components and the second portion of the system load including one or more power-consuming components, all of the power-consuming components of the first portion of the system load having an input voltage requirement that is higher than an input voltage requirement of all the power-consuming components of the second portion of the system load;
  using a charger circuit to receive input direct current (DC) power having an input DC voltage from an external power source, and to provide output DC power having an output DC voltage that is less than the input DC voltage to a first power node;
  always using power from the first power node to provide power to the power-consuming components of the second portion of the system load; and
  switching power for the power-consuming components of the first portion of the system load in real time between the first power node and a second power node that is coupled between the external power source and the charger input.

15. The method of claim 14, where all of the power-consuming components of the first portion of the system load have an input voltage requirement that is higher than the input DC voltage from the external power source; and where all of the power-consuming components of the second portion of the system load have an input voltage requirement that is lower than the input DC voltage from the external power source.

16. The method of claim 14, further comprising using at least one programmable integrated circuit to control a multiplexer switch to connect the multiplexer output to one of the first multiplexer input or the second multiplexer input at a time.

17. The method of claim 14, where the external power source comprises an external AC adapter; and further comprising receiving charging power in one or more battery cells from the charger circuit output; and providing battery power from the one or more battery cells to the first power node, the charger circuit output voltage is based on an output voltage of the one or more battery cells.

18. The method of claim 14, where all of the power-consuming components of the first portion of the system load have an input voltage requirement that is higher than an input voltage requirement of all the power-consuming components of the second portion of the system load; where the power-consuming components of the first portion of the system load comprises backlight circuitry for a display panel, where the power-consuming components of the second portion of the system load comprises programmable integrated circuit; and where the method further comprises:
  using the at least one programmable integrated circuit to provide signals to display visual images on the display panel; and
  using an embedded controller coupled to control the timing to switch power for the power-consuming components of the first portion of the system load in real time between the first power node and the second power node to connect the first portion of the system load to only power from the first power node when it is detected that the input DC voltage is not being supplied from the external power source to the second power node, and to connect the first portion of the system load to only power from the second power node when it is detected that the input DC voltage is being supplied from the external power source to the second power node.

19. The method of claim 18, further comprising monitoring total input current at the charger input; determining an input current limit value based on whether the power for the power-consuming components of the first portion of the system load is connected to the first power node or the second power node; and regulating maximum current passed through charger circuit based on the monitored total input current and the determined input current limit value; where the determined input current limit value is greater when power for the power-consuming components of the first portion of the system load is connected to the first power node than when the power for the power-consuming components of the first portion of the system load is connected to the second power node.

20. The method of claim 14, where all of the power-consuming components of the first portion of the system load have an input voltage requirement that is higher than an input voltage requirement of all the power-consuming components of the second portion of the system load; where the power-consuming components of the first portion of the system load comprises backlight circuitry for a display panel, where the power-consuming components of the second portion of the system load comprises programmable integrated circuit; and where the method further comprises:

using the at least one programmable integrated circuit to provide signals to display visual images on the display panel; and using an embedded controller coupled to control the timing to switch power for the power-consuming components of the first portion of the system load in real time between the first power node and the second power node based at least in part on the activity state of the display panel backlight circuitry and a detected state of input DC voltage from the external power source to:

connect the first portion of the system load to only power from the first power node only when it is detected that the input DC voltage is not being supplied from the external power source to the second power node or when the display panel backlight circuitry is not active, and connect the first system load portion of the system load to only power from the second power node only when it is detected that the input DC voltage is being supplied from the external power source to the second power node at the same time that the display panel backlight circuitry is active.

* * * * *

UNITED STATES PATENT AND TRADEMARK OFFICE
CERTIFICATE OF CORRECTION

PATENT NO. : 10,432,007 B2
APPLICATION NO. : 15/585436
DATED : October 1, 2019
INVENTOR(S) : Chen-Hsin Chang et al.

Page 1 of 1

It is certified that error appears in the above-identified patent and that said Letters Patent is hereby corrected as shown below:

In the Claims

In Claim 20, Column 22, Line 21, delete "first system load portion" and insert -- first portion --

Signed and Sealed this
Nineteenth Day of November, 2019

Andrei Iancu
*Director of the United States Patent and Trademark Office*